United States Patent
Akahori

(10) Patent No.: US 7,869,632 B2
(45) Date of Patent: Jan. 11, 2011

(54) AUTOMATIC TRIMMING METHOD, APPARATUS AND PROGRAM

(75) Inventor: Sadato Akahori, Kanagawa-ken (JP)

(73) Assignee: Fujifilm Corporation (JP)

( * ) Notice: Subject to any disclaimer, the term of this patent is extended or adjusted under 35 U.S.C. 154(b) by 957 days.

(21) Appl. No.: 11/730,042

(22) Filed: Mar. 29, 2007

(65) Prior Publication Data

US 2007/0230821 A1   Oct. 4, 2007

(30) Foreign Application Priority Data

Mar. 31, 2006   (JP)   ............... 2006-099211

(51) Int. Cl.
G06K 9/00   (2006.01)

(52) U.S. Cl. .................................. 382/118

(58) Field of Classification Search ............ None
See application file for complete search history.

(56) References Cited

U.S. PATENT DOCUMENTS

| | | | |
|---|---|---|---|
| 2003/0012435 A1* | 1/2003 | Forde | 382/167 |
| 2006/0104488 A1* | 5/2006 | Bazakos et al. | 382/118 |
| 2006/0147093 A1* | 7/2006 | Sanse et al. | 382/115 |

FOREIGN PATENT DOCUMENTS

| | | |
|---|---|---|
| JP | 2005-242641 A | 9/2005 |
| JP | 2005-267454 A | 9/2005 |

OTHER PUBLICATIONS

Lao et al., "Fast Omni-Direction Face Detection," Meeting on Image Recognition and Understanding (MIRU2004), 2004, pp. II271-II276. (Translation Included).

Yang et al., "Detecting Face in Images: a Survey," IEEE Transactions on Pattern Analysis and Machine Intelligence, vol. 24, No. 1, 2002, pp. 34-58.

Zhao et al., "Face Recognition: A Literature Survey," ACM Computing Surveys, vol. 35, No. 4, 2003, pp. 399-458.

Sakano, "Principal Component Analysis in Pattern Recognition-From the Viewpoint of Facial Image Recognition," Proceedings of the Institute of Statistical Mathematics, vol. 49, No. 1, 2001, pp. 23-42.

* cited by examiner

*Primary Examiner*—Brian P Werner
(74) *Attorney, Agent, or Firm*—Studebaker & Brackett PC; Donald R. Studebaker

(57) ABSTRACT

Trimming is automatically performed based on a person or persons in whom a photographer has interest. All of facial images included in a whole image are detected. Then, judgment is made as to whether each of the detected facial images is a facial image of a specific person, face information about whom is stored in a face database. If the detected facial images include a facial image or images of the specific person or persons, trimming is performed based on the facial image or images of the specific person or persons.

8 Claims, 6 Drawing Sheets

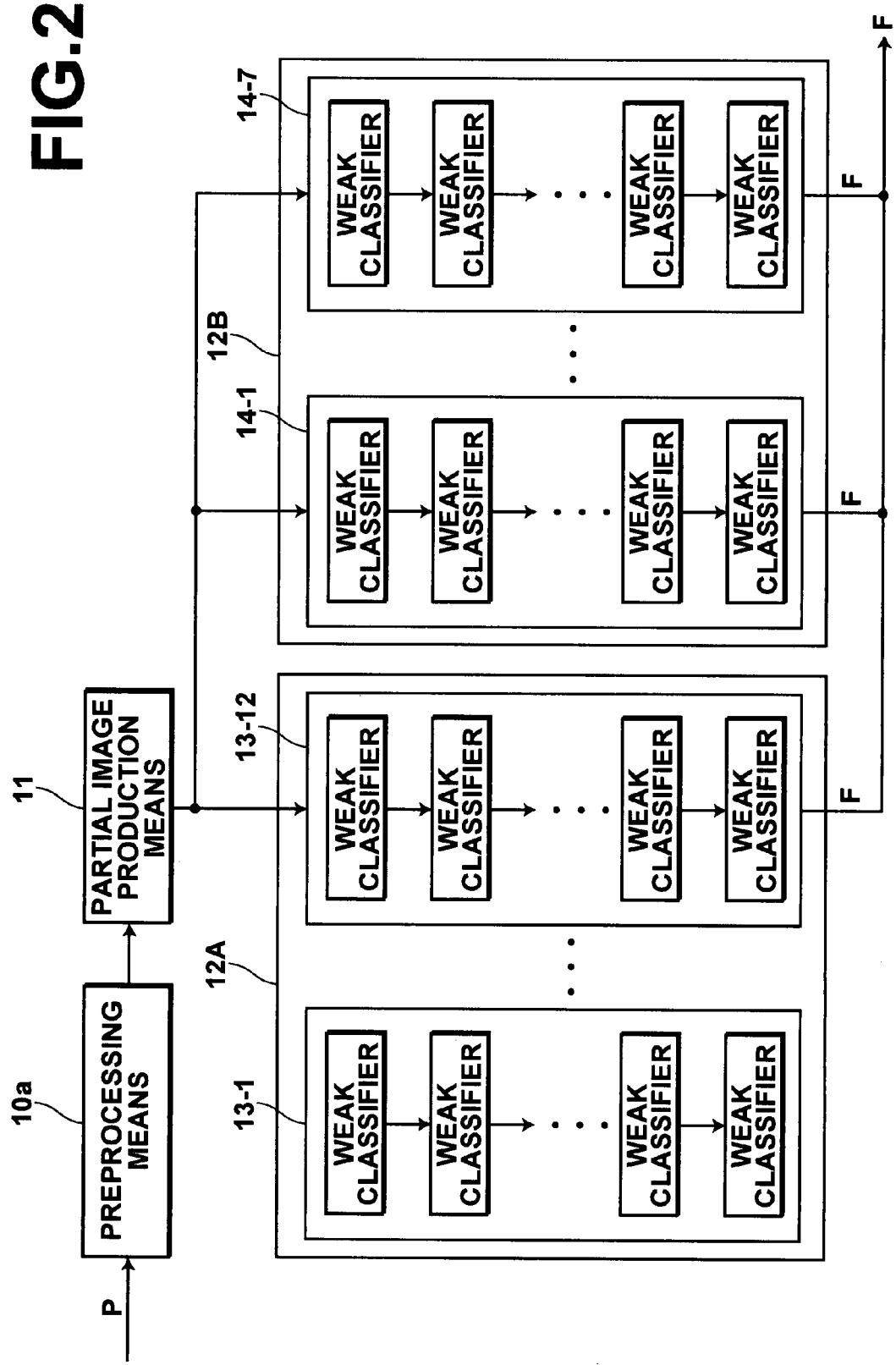

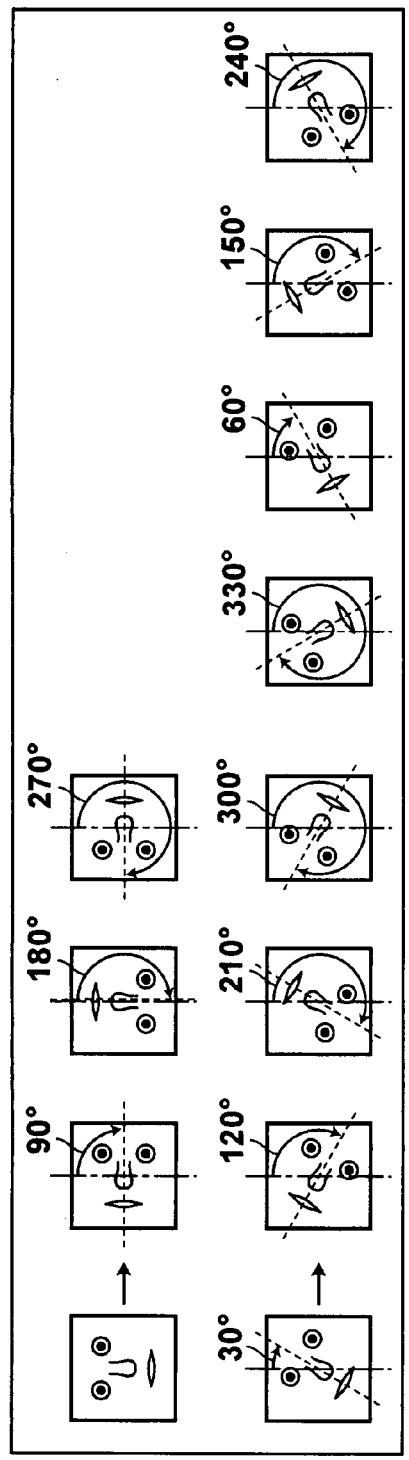
FIG. 4A FRONT-VIEW FACE
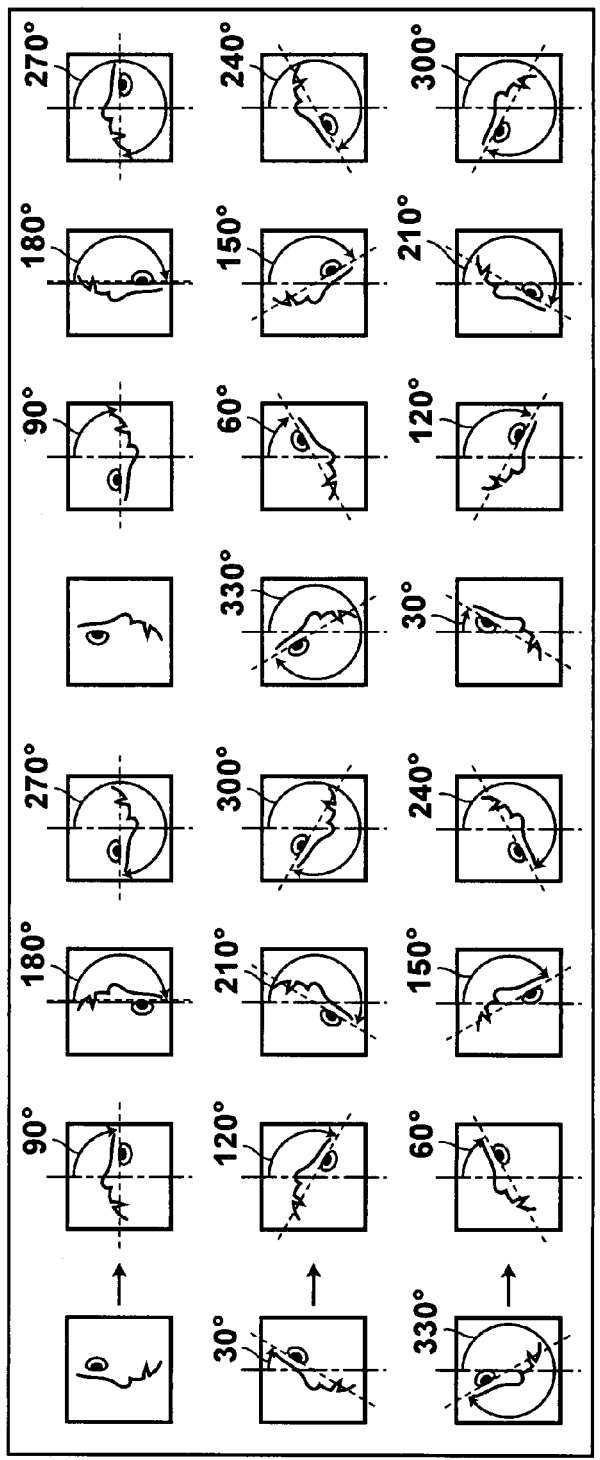
FIG. 4B PROFILE FACE

AUTOMATIC TRIMMING METHOD, APPARATUS AND PROGRAM

BACKGROUND OF THE INVENTION

1. Field of the Invention

The present invention relates to an automatic trimming method and apparatus for automatically trimming, based on the face of a specific person, a whole image obtained by a digital camera or the like. The present invention also relates to a program for the automatic trimming method and apparatus.

2. Description of the Related Art

A trimming method for producing a certificate photograph, which is used to apply for a passport or a license or to prepare a resume or the like, is well known. In the trimming method, a face in an image is enlarged or reduced to satisfy a standard for the certificate photograph, and trimming is performed so that the face is positioned at a predetermined position of the certificate photograph. Particularly, as techniques for detecting a face, eyes or the like in a photograph image have been improved, an automatic trimming method has been proposed (for example, please refer to Japanese Unexamined Patent Publication No. 2005-242641). In the automatic trimming method, trimming is performed by detecting a face, an eye or the like in a photograph image and by setting a trimming area based on the detection result. In Japanese Unexamined Patent Publication No. 2005-242641, first, a face, an eye or eyes and a pupil or pupils are detected in a photograph image. Then, the positions of the pupils and a distance between the pupils are calculated. Further, a trimming frame is set, based on the positions of the pupils and the distance therebetween, so that the whole face is included in the trimming frame. After then, data for trimming is produced by attaching information about the trimming frame to the photograph image.

Besides the aforementioned automatic trimming method for a certificate photograph, a method for automatically performing trimming on an image obtained by a user using a digital camera or the like has been proposed (for example, please refer to Japanese Unexamined Patent Publication No. 2005-267454). In Japanese Unexamined Patent Publication No. 2005-267454, first, human faces are detected in a photograph image. Then, the position and the size of a trimming area are set based on the positions of all of the detected faces so that all of the faces are included in the trimming area. Automatic trimming is performed based on the trimming area.

In Japanese Unexamined Patent Publication No. 2005-267454, the trimming frame is set so that all of the detected faces are included in the trimming frame. Therefore, a person such as a passerby for example, who does not need to be included in the trimming frame, is included therein. Consequently, when an image is obtained by trimming, a person in whom a photographer has interest is positioned close to an edge of the image or the size of the person becomes too small. Hence, there is a problem that automatic trimming is not performed based on the images of persons which the photographer wants to obtain.

SUMMARY OF THE INVENTION

In view of the foregoing circumstances, it is an object of the present invention to provide an automatic trimming method and apparatus for automatically performing trimming based on a specific person or persons in whom a photographer has interest. It is also an object of the present invention to provide a program for the automatic trimming method and apparatus.

An automatic trimming method of the present invention is an automatic trimming method comprising the steps of:

detecting a facial image in a whole image;

recognizing whether the detected facial image is a facial image of a specific person, face information about whom is registered in a face database; and if the detected facial image is recognized as a facial image of the specific person, the face information about whom is registered in the face database, automatically performing trimming based on the position of the recognized facial image.

An automatic trimming apparatus of the present invention is an automatic trimming apparatus comprising:

a face detection means for detecting a facial image in a whole image;

a face database in which face information about a specific person is registered;

a recognition means for recognizing whether the facial image detected by the face detection means is a facial image of the specific person, the face information about whom is registered in the face database; and a trimming means, wherein if the recognition means recognizes that the detected facial image is a facial image of the specific person, the face information about whom is registered in the face database, the trimming means automatically performs trimming based on the position of the recognized facial image.

An automatic trimming program of the present invention is an automatic trimming program for causing a computer to execute an automatic trimming method, the program comprising the procedures for:

detecting a facial image in a whole image;

recognizing whether the detected facial image is a facial image of a specific person, face information about whom is registered in a face database; and if the detected facial image is recognized as a facial image of the specific person, the face information about whom is registered in the face database, automatically performing trimming based on the position of the recognized facial image.

Here, the trimming means may automatically perform trimming by using any kind of method as long as automatic trimming is performed based on the position of the facial image of the person, the face information about whom is registered. For example, the trimming means may automatically perform trimming so that the facial image is positioned at a predetermined position of a trimming frame.

The face database may be a database in which a single facial image is registered. Alternatively, the face database may be a database in which a plurality of facial images are registered. If the recognition means recognizes that a plurality of facial images of specific persons, face information about whom is registered in the face database, are present in the whole image, the trimming means may set a trimming frame for each of the plurality of facial images. Alternatively, the trimming means may set a trimming frame so that the plurality of recognized facial images are included in a trimming frame.

The face detection means may use any kind of face detection method. For example, the face detection means may include a partial image production means for producing a plurality of partial images by scanning the whole image using a subwindow formed by a frame of a set number of pixels and a face classifier for detecting a facial image included in the plurality of partial images produced by the partial image production means. Further, the face classifier may judge whether each of the plurality of partial images is a facial image using a plurality of classification results obtained by a plurality of weak classifiers.

Further, the face information may be a facial image. Alternatively, the face information may be a feature value of a face.

In the automatic trimming method, apparatus and program of the present invention, a facial image is detected in a whole image, and judgment is made as to whether the detected facial image is a facial image of a specific person, face information about whom is registered in a face database. If the detected facial image is recognized as a facial image of the specific person, the face information about whom is registered in the face database, trimming is automatically performed based on the position of the recognized facial image. Therefore, even if the face of a person such as a passerby, who has no relationship with the photographer, is present in the whole image, it is possible to set a trimming frame based on the specific person in whom the photographer has interest. Hence, it is possible to automatically perform trimming so that the intention of the photographer is reflected in an image obtained by trimming.

If the trimming means performs trimming on the whole image so that the facial image is positioned at a predetermined position of a trimming frame, it is possible to automatically produce a trimming image that has desirable composition.

Further, if the recognition means recognizes that a plurality of facial images of specific persons, face information about whom is registered in the face database, are present in the whole image, the trimming means may set a trimming frame so that the plurality of recognized facial images are included in the trimming frame. If the trimming means sets the trimming frame in such a manner, a plurality of persons that are present in the whole image, and in whom the photographer has interest, can be surely included in the trimming frame.

Further, the face detection means may include a partial image production means for producing a plurality of partial images by scanning the whole image using a subwindow formed by a frame of a set number of pixels and a face classifier for detecting a facial image included in the plurality of partial images produced by the partial image production means. Further, the face classifier may judge whether each of the plurality of partial images is a facial image using a plurality of classification results obtained by a plurality of weak classifiers. If the face detection means detects a face or faces in such a manner, it is possible to detect faces accurately and efficiently.

Note that the program of the present invention may be provided being recorded on a computer readable medium. Those who are skilled in the art would know that computer readable media are not limited to any specific type of device, and include, but are not limited to: floppy disks, CD's RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 2 is a block diagram illustrating an example of a face detection means in the automatic trimming apparatus illustrated in FIG. 1;

FIG. 4A is a schematic diagram illustrating examples of front-view faces detected by a face detection means, illustrated in FIG. 2;

FIG. 4B is a schematic diagram illustrating examples of profile faces detected by the face detection means, illustrated in FIG. 2;

DESCRIPTION OF THE PREFERRED EMBODIMENTS

Figure 1:
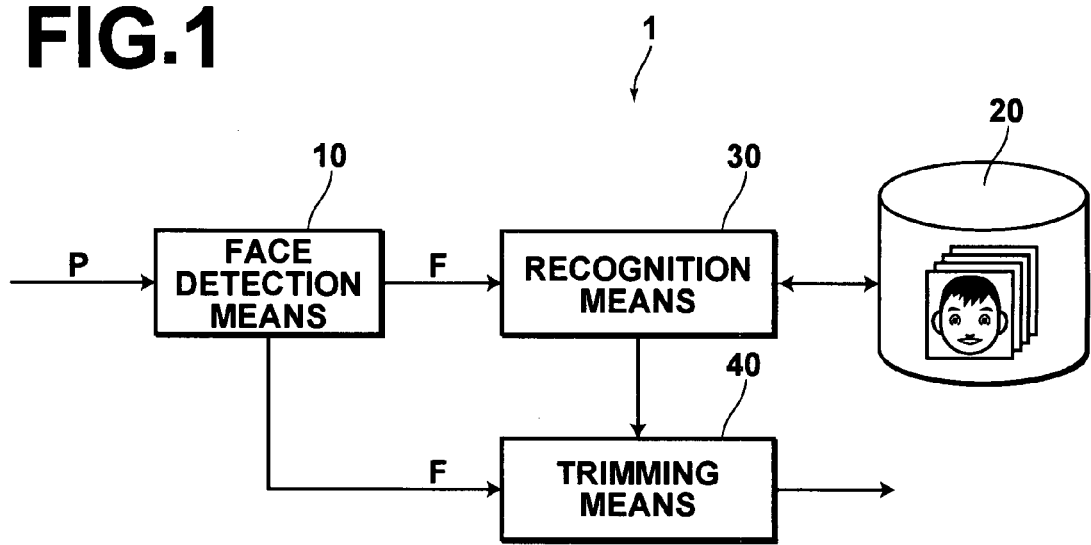
FIG. 1 is a block diagram illustrating an automatic trimming apparatus in a preferred embodiment of the present invention.

Hereinafter, preferred embodiments of an automatic trimming apparatus of the present invention will be described in detail with reference to the attached drawings. The configuration of an automatic trimming apparatus 1, illustrated in FIG. 1, is realized by causing a computer (for example, a personal computer or the like) to execute an automatic trimming program that has been read in an auxiliary storage device. In that case, the automatic trimming program is stored in an information storage medium, such as a CD-ROM, or distributed through a network, such as the Internet. Then, the automatic trimming program is installed in the computer. Alternatively, the automatic trimming program may be installed in a processor of a digital camera to realize the configuration of the automatic trimming apparatus 1.

The automatic trimming apparatus 1 automatically performs trimming by setting a trimming frame in a whole image P obtained by a digital camera or the like. The automatic trimming apparatus 1 includes a face detection means 10, a face database 20, a recognition means 30 and a trimming means 40. The face detection means 10 detects a facial image F in the whole image P. In the face database 20, a specific person or persons are registered. The recognition means 30 recognizes whether the facial image F is a facial image of a specific person registered in the face database 20. The trimming means 40 automatically performs trimming based on the position of the facial image F if the recognition means 30 judges that the facial image F is a facial image of the specific person registered in the face database 20.

The face detection means 10 includes a partial image production means 11, a front-view face classification means 12A and a profile face classification means 12B, as illustrated in FIG. 2. The partial image production means 11 produces a plurality of partial images PP by scanning the whole image P using a subwindow W. The front-view face classification means 12A detects a partial image or images, each representing a front-view face, from the plurality of partial images PP, produced by the partial image production means 11. The profile face classification means 12B detects a partial image or images, each representing a profile face (side-view face), from the plurality of partial images PP, produced by the partial image production means 11.

Before the whole image P is input to the partial image production means 11, a preprocessing means 10a performs preprocessing on the whole image P. The preprocessing means 10a has a function for producing a plurality of whole images at multiple resolution levels from the whole image P. The preprocessing means 10a produces whole images P2, P3 and P4, which have different resolution levels from each other, as illustrated in FIGS. 3A through 3D. Further, the preprocessing means 10a has a function for normalizing (hereinafter, referred to as local normalization) contrast in the entire area of the whole image P so that the contrast in the entire area thereof becomes a predetermined level. The preprocessing means 10a normalizes the contrast in the entire area of the whole image P by reducing the variation of contrast in a local area thereof.

Figure 3A:
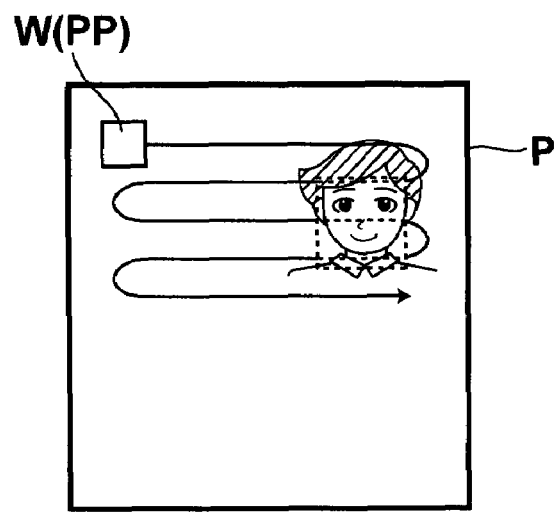
FIG. 3A is a schematic diagram illustrating how a partial image production means, illustrated in FIG. 2, scans a whole image using a subwindow.

The partial image production means 11 scans the whole image P using a subwindow W including a set number of pixels (for example, 32 pixels×32 pixels) and extracts an area surrounded by the subwindow W, as illustrated in FIG. 3A. Accordingly, the partial image production means 11 produces partial images PP, each including the set number of pixels. Particularly, the partial image production means 11 produces the partial images PP by moving the subwindow W by a constant number of pixels each time.

Figure 3B:
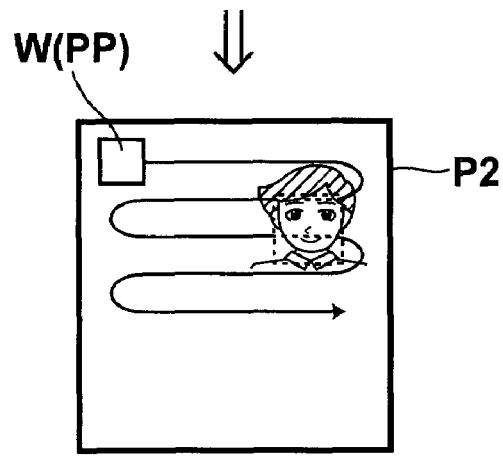
FIG. 3B is a schematic diagram illustrating how the partial image production means, illustrated in FIG. 2, scans a whole image using a subwindow.
Figure 3C:
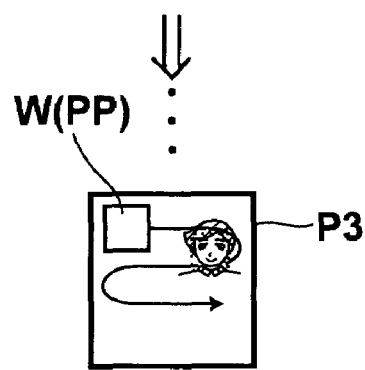
FIG. 3C is a schematic diagram illustrating how the partial image production means, illustrated in FIG. 2, scans a whole image using a subwindow.
Figure 3D:
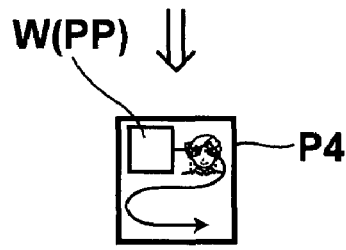
FIG. 3D is a schematic diagram illustrating how the partial image production means, illustrated in FIG. 2, scans a whole image using a subwindow.

The partial image production means 11 also produces partial images PP by scanning each of produced low-resolution images using a subwindow W, as illustrated in FIGS. 3B through 3D. Since the partial image production means 11 also produces the partial images PP from the low-resolution images, even if a face in the whole image P is too large to be included in the subwindow W, the same face in a low-resolution image can be included in the subwindow W. Therefore, it is possible to surely detect faces.

The front-view face classification means 12A and the profile face classification means 12 detect facial images F, for example, by using Adaboosting algorithm. The front-view face classification means 12A has a function for detecting in-plane-rotated front-view faces (please refer to FIG. 4A). The front-view face classification means 12A includes 12 front-view face classifiers 13-1 through 13-12. The rotation angles of the front-view face classifiers are different from each other by 30 degrees within the range of 30 to 330 degrees. Further, each of the front-view face classifiers 13-1 through 13-12 can detect faces at rotation angles of −15 (=345 degrees) through +15 degrees with respect to zero degree. The profile face classification means 12B has a function for detecting in-plane-rotated profile faces (please refer to FIG. 4B). For example, the profile face classification means 12B includes 7 profile face classifiers 14-1 through 14-7, of which the rotation angles are different from each other by 30 degrees within the range of −90 to +90 degrees. Further, the profile face classification means 12B may include a profile face classifier for detecting out-of-plane-rotated facial images. The out-of-plane-rotated facial images are images, each including a face, of which the direction has been further rotated (out-of-plane rotation) from that of an in-plane-rotated face.

Each of the front-view face classifiers 13-1 through 13-12 and the profile face classifiers 14-1 through 14-7 has a function for judging whether a partial image PP is a facial image or a non-facial image using two values. Further, each of the front-view face classifiers 13-1 through 13-12 and the profile face classifiers 14-1 through 14-7 includes a plurality of weak classifiers $CF_1$ through $CF_M$ (M: the number of weak classifiers). Each of the weak classifiers $CF_1$ through $CF_M$ has a function for judging whether a partial image PP is a facial image or not using a feature value x by extracting the feature value x from the partial image PP. Finally, each of the face classifier means 12A and 12B judges whether the partial image PP is a facial image or not by using judgment results obtained by the weak classifiers $CF_1$ through $CF_M$.

Figure 5:
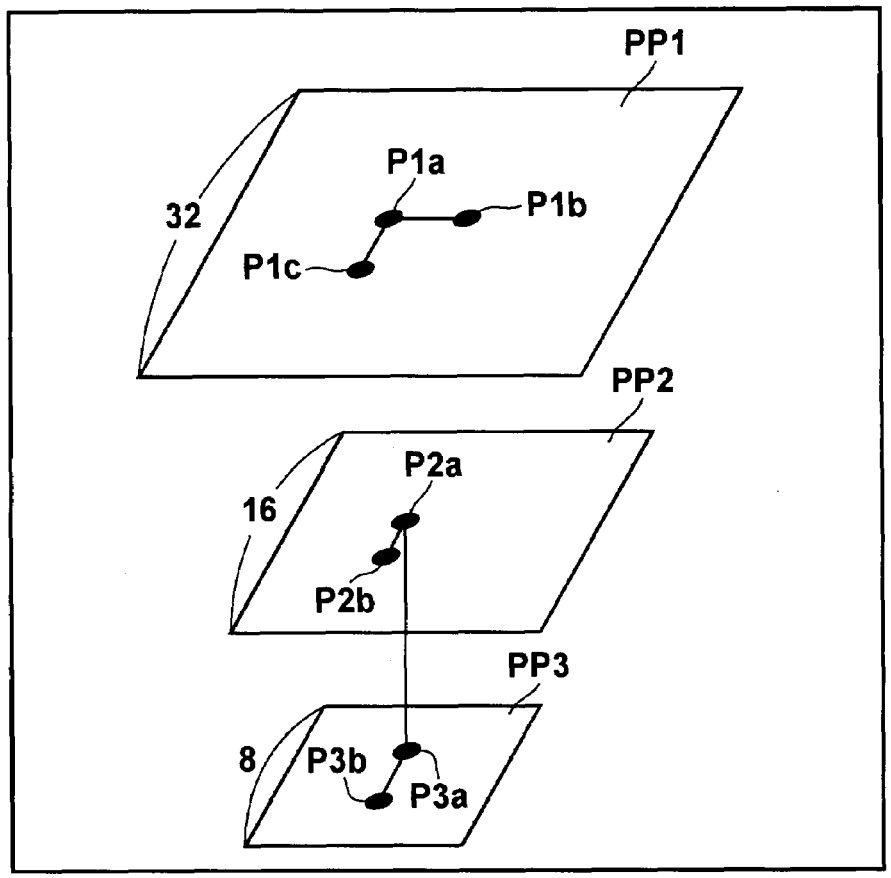
FIG. 5 is a schematic diagram illustrating how weak classifiers illustrated in FIG. 2 extract feature values from partial images.

Specifically, each of the weak classifiers $CF_1$ through $CF_M$ extracts brightness values or the like at coordinates P1a, P1b and P1c, which are set in the partial image PP (PP1), as illustrated in FIG. 5. Further, each of the weak classifiers $CF_1$ through $CF_M$ extracts brightness values or the like at coordinate positions P2a and P2b, which are set in a low-resolution image PP2 of the partial image PP. Further, each of the weak classifiers $CF_1$ through $CF_M$ extracts brightness values or the like at coordinate positions P3a and P3b, which are set in a low-resolution image PP3 of the partial image PP. Then, a difference in brightness between two of the seven coordinates P1a through P3b is used as a feature value x. Each of the weak classifiers $CF_1$ through $CF_M$ uses a different feature value from each other. For example, the weak classifier $CF_1$ uses a difference in brightness between coordinate P1a and coordinate P1c as a feature value, and the weak classifier $CF_2$ uses a difference in brightness between coordinate P2a and coordinate P2b as a feature value.

In the above description, a case in which each of the weak classifiers $CF_1$ through $CF_M$ extracts a feature value x has been described as an example. Alternatively, the aforementioned feature values x may be extracted in advance for a plurality of partial images PP and the extracted feature values x may be input to the weak classifiers $CF_1$ through $CF_M$, respectively. In the above example, the brightness value was used to obtain the feature value. Alternatively, other information, such as contrast and edge, may be used to obtain the feature value.

Figure 6:
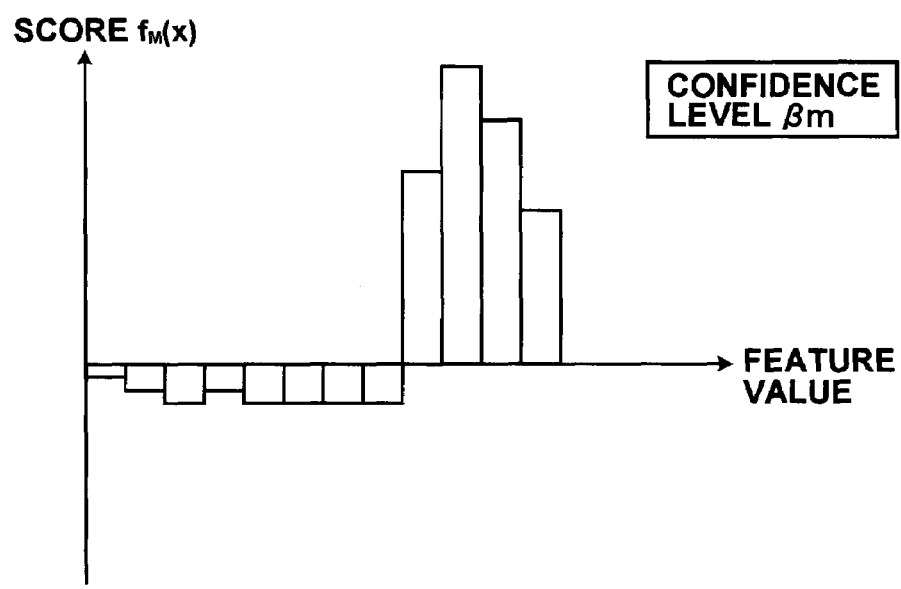
FIG. 6 is a graph as an example of a histogram included in each of the weak classifiers illustrated in FIG. 2.

Each of the weak classifiers $CF_1$ through $CF_M$ includes a histogram as illustrated in FIG. 6. The weak classifiers $CF_1$ through $CF_M$ output, based on the histograms, scores $f_1(x)$ through $f_M(x)$ corresponding to respective feature values x. Further, the weak classifiers $CF_1$ through $CF_M$ include confidence levels $\beta_1$ through $\beta_M$, each representing the judgment performance thereof. The weak classifiers $CF_1$ through $CF_M$ calculate judgment scores $\beta_m \cdot f_m(x)$ using scores $f_1(x)$ through $f_M(x)$ and confidence levels $\beta_1$ through $\beta_M$. Then, judgment is made as to whether the value of the judgment score $\beta_m \cdot f_m(x)$ of each of the weak classifiers $CF_m$ is greater than or equal to a set threshold value Sref. If the value of the judgment score $\beta_m \cdot f_m(x)$ is greater than or equal to the set threshold value Sref, the partial image is recognized as a facial image ($\beta_m \cdot f_m(x) \geq Sref$).

Further, each of the weak classifiers $CF_1$ through $CF_M$ has a cascade structure. Only when all of the week classifiers $CF_1$ through $CF_M$ have judged that a partial image PP is a facial image, the partial image PP is output as a facial image F. Specifically, weak classifier $CF_{m+1}$ on the downstream side of a weak classifier $CF_m$ performs judgment only on a partial image PP that has been judged as a facial image by the weak classifier $CF_m$. In other words, if a partial image PP is judged as a non-facial image by the weak classifier $CF_m$, the weak classifier $CF_{m+1}$ on the downstream side of the weak classifier CF$_m$ does not perform judgment on the partial image PP. Accordingly, it is possible to reduce the number (data amount) of partial images PP that should be judged by weak classifiers on the downstream side. Hence, it is possible to increase the speed of judgment operation. The detail of a classifier that has a cascade structure is disclosed in Shihong LAO et al., "Fast Omni-Direction Face Detection", Meeting on Image Recognition and Understanding (MIRU2004), pp. II271-II276, 2004.

Further, each of the classifiers 13-1 through 13-12 and 14-1 through 14-7 includes weak classifiers that have learned front-view faces or profile faces as correct-answer sample images. The front-view faces and the profile faces that have been learned by the weak classifiers are in-plane-rotated faces that should be judged by the respective weak classifiers, and which are rotated at predetermined angles. Further, it is not necessary to separately judge whether each of the judgment scores $S_1$ through $S_M$, which have been output from the weak classifiers $CF_1$ through $CF_M$, is greater than or equal to a judgment score threshold value Sref. Alternatively, the weak classifier CFm may judge whether the sum $(\Sigma_{r=1}^{m} \beta r \cdot fr)$ of the judgment scores by weak classifiers $CF_1$ through $CF_{m-1}$ on the upstream side of the weak classifier $CF_m$ is greater than or equal to a judgment score threshold value S1ref $(\Sigma_{r=1}^{m} \beta r \cdot fr(x) \geq S1ref)$. Accordingly, the judgment scores by the upstream-side weak classifiers can be taken into consideration to make judgment. Therefore, it is possible to improve the accuracy of judgment.

Further, as an example of the face detection means 10, a case in which faces are detected by using Adaboosting algorithm has been described. Alternatively, faces may be detected by using SVM (Support Vector Machine) algorithm or other known face detection algorithm, such as a face detection method disclosed in Ming-Hsuan Yang et al., "Detecting Faces in Images: a Survey", IEEE Transactions on Pattern Analysis and Machine Intelligence, vol. 24, No. 1, pp. 34-58, 2002.

In the face database 20, illustrated in FIG. 1, information about a facial image F of a specific person in whom a photographer has interest is registered in advance. The specific person in whom the photographer has interest is a person, such as the photographer, him/herself, or a person with whom the photographer has a relationship. For example, the facial image in the face database 20 is an image registered in the past by using an image including the photographer or the like. The recognition means 30 recognizes whether a facial image F is a facial image of a specific person by judging whether the facial image F is a facial image registered in the face database 20. Here, faces may be recognized by using various kinds of methods. For example, well-known face recognition techniques, such as a method for recognizing a face by using a local feature value of a facial image, a method for recognizing a face by using Adaboosting algorithm, a graph matching method and a template matching method, may be used. The face recognition techniques are described in detail in W. Zhao et al., "Face Recognition: A Literature Survey", ACM Computing Surveys, Vol. 35, No. 4, pp. 399-458, 2003, S. Lao et al., "a Survey on Face Detection and Face Recognition", CVIM, May 2005 (149th) Meeting, H. Sakano, "Principal Component Analysis in Pattern Recognition—From the Viewpoint of Facial Image Recognition—", Proceedings of the Institute of Statistical Mathematics, vol. 49, No. 1, pp. 23-42, 2001, and the like. Meanwhile, information registered in the face database 20 is face information (for example, a local feature value of a facial image, a facial image, itself, or the like) in a format that is most appropriate for the aforementioned face recognition algorithm.

Figure 7:
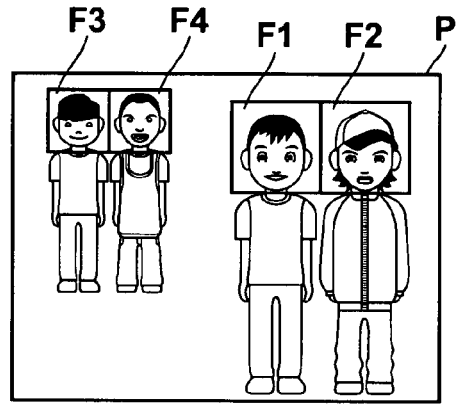
FIG. 7 is a schematic diagram illustrating an example of a whole image in which a plurality of facial images are detected.
Figure 8:
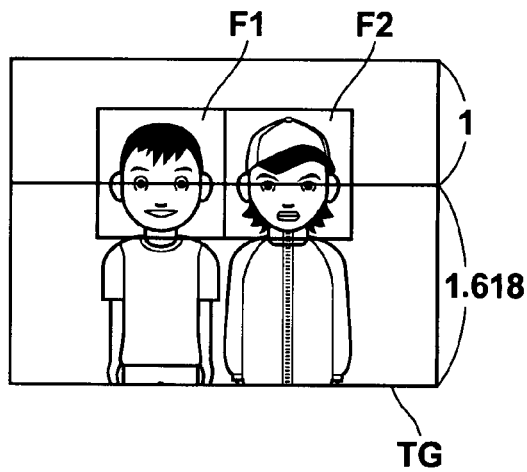
FIG. 8 is a schematic diagram illustrating an example of an image obtained by automatically performing trimming on the whole image illustrated in FIG. 7.

The trimming means 40 has a function for performing trimming so that a facial image F recognized by the recognition means 30 is positioned at a predetermined position of a trimming frame. For example, if the face detections means 10 detects four facial images F1 through F4 in a whole image P illustrated in FIG. 7 and the recognition means 30 recognizes two facial images F1 and F2, the trimming means 40 sets a trimming frame TG as illustrated in FIG. 8. The trimming means 40 sets the trimming frame so that the facial image F is positioned at a position satisfying the ratio of 1 (up):1.618 with respect to the vertical direction of the trimming frame TG. At the same time, the trimming means 40 automatically sets the trimming frame TG with respect to the horizontal direction so that the midpoint of an area including the two facial image F1 and F2 with respect to the horizontal direction becomes the same as the center of the trimming frame TG. Since the position of the trimming frame TG is determined based on the aforementioned ratio, it is possible to automatically produce a trimming image that has desirable composition.

As described above, trimming is automatically performed based on the facial images F1 and F2 recognized by the recognition means 30. Therefore, it is possible to perform trimming based on a person or persons in whom the photographer has interest. Specifically, if a trimming frame TG is set based on all of the detected facial images F1 through F4, as in the conventional method, the facial images F1 and F2, in whom the photographer has interest, are positioned off the center of the trimming frame TG. Further, the sizes of the facial images F1 and F2 become relatively small. Hence, it is difficult to perform trimming as desired by the photographer. In contrast, if trimming is automatically performed based on the facial images F1 and F2, recognized by the recognition means 30, as illustrated in FIG. 8, even if facial images F3 and F4, such as facial images of passersby, in whom the photographer does not have interest, are detected, it is still possible to set a trimming frame TG based on the facial images F1 and F2 of persons in whom the photographer has interest. Consequently, it is possible to automatically perform trimming so that the intention of the photographer is reflected in an image obtained by trimming.

Further, as illustrated in FIG. 8, if the recognition means 30 recognizes that the plurality of facial images F1 and F2 are facial images of persons, the persons being registered in the face database 20, the trimming means 40 sets a trimming frame TG so that the plurality of facial images F1 and F2 are included in the trimming frame TG. Therefore, when a plurality of persons in whom the photographer has interest are present in a whole image P, it is possible to surely include the plurality of persons in the trimming frame.

Figure 9:
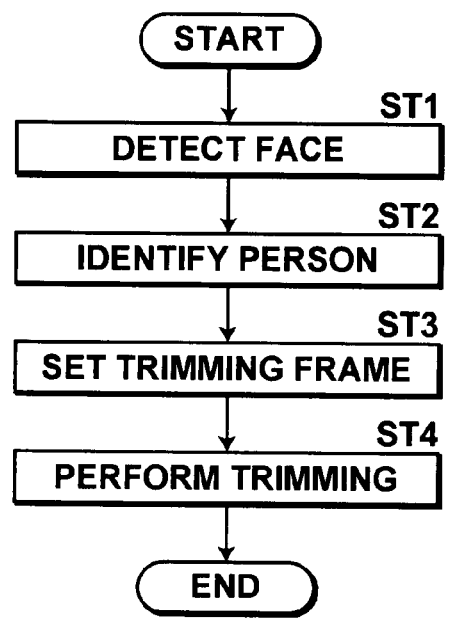
FIG. 9 is a flowchart illustrating an automatic trimming method in a preferred embodiment of the present invention.

FIG. 9 is a flowchart showing a preferred embodiment of an automatic trimming method according to the present invention. The automatic trimming method will be described with reference to FIGS. 1 through 9. First, the face detection means 10 detects a facial image F in a whole image P (step ST1). Then, the recognition means 30 recognizes whether the detected face is the face of a specific person, the specific person being stored in the face database 20 (step ST2). If the face of the specific person is detected, the trimming means 40 performs trimming based on the face of the specific person (step ST3).

In the aforementioned embodiments, a facial image F is detected in a whole image P, and processing is performed to recognize whether the detected facial image F is a facial image of a specific person, the specific person being registered in the face database 20. If it is recognized that the facial image F is a facial image of the specific person, trimming is automatically performed based on the position of the recognized facial image F. Therefore, even if the face of a person, such as a passerby, who has no relationship with the photographer is present in the whole image P, it is possible to set a trimming frame based on the specific person in whom the photographer has interest. Hence, it is possible to automatically perform trimming so that the intention of the photographer is reflected in an image obtained by trimming.

The embodiments of the present invention are not limited to the aforementioned embodiments. For example, in FIG. 8, when a plurality of detected faces are faces registered in the database 20, the trimming frame TG is set so that the plurality of facial images F are included in the trimming frame TG. However, the trimming means 40 may set a plurality of trimming frames based on respective facial images. Further, the plurality of trimming frames may be displayed on a display unit so that the photographer can select an appropriate trimming frame from the plurality of trimming frames.

Further, in the aforementioned embodiments, a case in which the trimming means 40 automatically sets a trimming frame has been described as an example. In addition, a correction means may be provided so that a user can correct the position and the size of the trimming frame TG after the trimming frame is automatically set.

Further, the automatic trimming apparatus in the aforementioned embodiments may be mounted on a photography apparatus, such as a digital camera. Further, when a whole image P is obtained by remote photography using a remote-operation camera or the like, the direction, the zoom, the focus or the like of the remote-operation camera may be controlled based on composition obtained by performing the aforementioned automatic trimming.

Further, when the trimming means 40 sets a trimming frame TG based on the facial image F, a standard position and a standard size of a person area may be set in advance for each photography mode, such as a portrait mode and a person photography mode. Then, a trimming frame TG may be set so that the position and the size of a person area become appropriate for the photography mode of photography. For example, if a whole image P is obtained by photography in a portrait mode, the trimming means 40 sets a trimming frame TG so that the size of a person area becomes larger than that of a person area obtained in a mode other than the portrait mode.

Further, when a trimming frame TG is set, the position and the size of the trimming frame TG may be corrected by using information other than information about the person in combination with the aforementioned information. For example, as disclosed in Japanese Unexamined Patent Publication No. 2004-310753, the meaning of an object area may be identified with reference to the whole image P, and a trimming frame TG may be set so that a specific object area (for example, structures, buildings or the like) is included in the trimming frame TG. When the trimming frame TG is set in such a manner, first, the trimming frame TG may be set so that the position and the size of a person area become a predetermined position and a predetermined size. Then, the position and the size of the person area may be corrected so that the object area is included in an image obtained by trimming.

In the aforementioned example, a case in which the recognition means 30 recognizes a specific person by face recognition (authentication) has been described. Alternatively, a subject of photography may be identified by receiving a signal from an IC (integrated circuit) tag carried by the subject of photography. Further, when a trimming frame TG is set, a photography position and a photography direction may be obtained from an IC tag carried by a subject of photography (person) or GPS (global positioning system) and a direction sensor, as disclosed in Japanese Unexamined Patent Publication No. 2002-10114. Then, the trimming frame TG may be set based on conditions estimated from the photography position and the photography direction (for example, by obtaining information about scenery or structures in the surroundings of the place of photography from a database, such as a map information database). For example, the trimming means 40 may store the position and the size of a person area in advance for each photography position and for each photography direction. Then, when a photography position and a photography direction are obtained from the tag information or the like of the whole image P, a trimming frame TG may be set so that the position and the size of a person area become the stored position and the stored size.

What is claimed is:

1. An automatic trimming method comprising the steps of:
    detecting a facial image in a whole image;
    recognizing whether the detected facial image is a facial image of a specific person, face information about whom is registered in a face database; and
    if the detected facial image is recognized as a facial image of the specific person, the face information about whom is registered in the face database, automatically performing trimming based on the position of the recognized facial image.

2. An automatic trimming apparatus comprising:
    a face detection means for detecting a facial image in a whole image;
    a face database in which face information about a specific person is registered;
    a recognition means for recognizing whether the facial image detected by the face detection means is a facial image of the specific person, the face information about whom is registered in the face database; and
    a trimming means, wherein if the recognition means recognizes that the detected facial image is a facial image of the specific person, the face information about whom is registered in the face database, the trimming means automatically performs trimming based on the position of the recognized facial image.

3. An automatic trimming apparatus, as defined in claim 2, wherein the trimming means performs trimming on the whole image so that the recognized facial image is positioned at a predetermined position of a trimming frame.

4. An automatic trimming apparatus, as defined in claim 2, wherein if the recognition means recognizes that a plurality of facial images of specific persons, face information about whom is registered in the face database, are present in the whole image, the trimming means sets a trimming frame so that the plurality of facial images are included in the trimming frame.

5. An automatic trimming apparatus, as defined in claim 2, wherein the face detection means includes a partial image production means for producing a plurality of partial images by scanning the whole image using a subwindow formed by a frame of a set number of pixels and a face classifier for detecting a facial image included in the plurality of partial images produced by the partial image production means, and wherein the face classifier judges whether each of the plurality of partial images is a facial image using a plurality of classification results obtained by a plurality of weak classifiers.

6. An automatic trimming apparatus, as defined in claim 2, wherein the face information is a facial image.

7. An automatic trimming apparatus, as defined in claim 2, wherein the face information is a feature value of a face.

8. A computer readable storage medium storing an automatic trimming program for causing a computer to execute an automatic trimming method, the program comprising the procedures for:

detecting a facial image in a whole image;

recognizing whether the detected facial image is a facial image of a specific person, face information about whom is registered in a face database; and if the detected facial image is recognized as a facial image of the specific person, the face information about whom is registered in the face database, automatically performing trimming based on the position of the recognized facial image.

\* \* \* \* \*